United States Patent [19]
Yankee

[11] 3,892,792
[45] July 1, 1975

[54] PROCESS FOR THE SYNTHESIS OF PGE COMPOUNDS FROM PGF COMPOUNDS

[75] Inventor: Ernest W. Yankee, Portage, Mich.

[73] Assignee: The Upjohn Company, Kalamazoo, Mich.

[22] Filed: Dec. 26, 1973

[21] Appl. No.: 427,837

Related U.S. Application Data

[63] Continuation of Ser. No. 207,630, Dec. 13, 1971, abandoned.

[52] U.S. Cl.... 260/448.8 R; 260/468 D; 260/514 D
[51] Int. Cl. .............................................. C07c 51/00
[58] Field of Search...... 260/408 D, 514 D, 448.8 R

[56] References Cited
UNITED STATES PATENTS 3,728,382    4/1973    Bundy ................................. 260/514

OTHER PUBLICATIONS

Weisz et al., Acta Chim. Acad. Sci. Hung.–58, 184, (1968).

*Primary Examiner*—Robert Gerstl
*Attorney, Agent, or Firm*—Morris L. Nielsen

[57] ABSTRACT

Prostaglandin E acids and esters are obtained by selectively silylating the corresponding prostaglandin $F_\alpha$ compounds at the C-11 and C-15 positions, oxidizing the C-9 hydroxyl to an oxo group, and then removing the silyl groups by hydrolysis. The process and intermediates are useful in preparing prostaglandin-type compounds having pharmacological utility.

10 Claims, No Drawings

PROCESS FOR THE SYNTHESIS OF PGE COMPOUNDS FROM PGF COMPOUNDS

This is a continuation, of application Ser. No. 207,630, filed Dec. 13, 1971 now abandoned.

BACKGROUND OF THE INVENTION

This invention relates to a process for preparing prostaglandin E's from prostaglandin $F_\alpha$'s, and to certain intermediates useful in that process. Particularly, this invention relates to a process for preparing 11,15-disilyl ether intermediates of prostaglanoin $F_\alpha$ ("$PGF_\alpha$") compounds and prostaglandin E ("PGE") compounds.

This invention relates to novel derivatives of prostanoic acid which has the following structure and atom numbering:

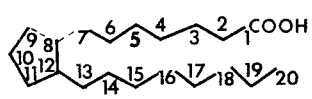

Various derivatives of prostanoic acid are known in the art. These are called prostaglandins. See, for example, Bergstrom et al., Pharmacol. Rev. 20, 1 (1968), and references cited therein. For example, prostaglandin $E_1$ ($PGE_1$) has the following structure:

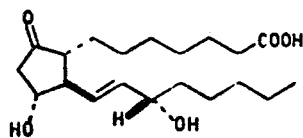

Prostaglandin $E_2$ ($PGE_2$) has the following structure:

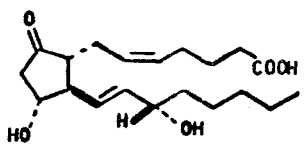

Prostaglandin $E_3$ ($PGE_3$) has the following structure:

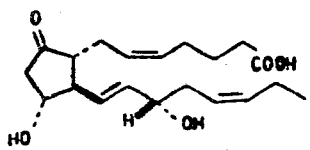

Dihydroprostaglandin $E_1$ (dihydro-$PGE_1$) has the following structure:

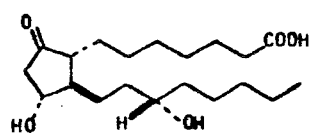

Prostaglandins with a secondary alpha or beta hydroxy in place of the ring oxo of the prostaglandins E are also known. These are called prostaglandins F. For example, prostaglandin $F_{2\alpha}$ ($PGF_{2\alpha}$) has the following structure:

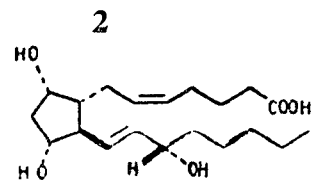

Prostaglandin $F_{2\beta}$ ($PGF_{2\beta}$) has the following structure:

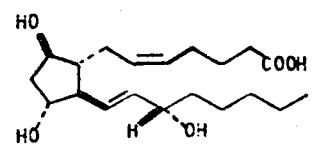

Prostaglandins $F_\alpha$ and $F_\beta$ corresponding to $PGE_1$, $PGE_3$, and dihydro-$PGE_1$ are also known.

In formulas II to VII, broken line attachments to the cyclopentane ring indicate substituents in alpha configuration, i.e., below the plane of the cyclopentane ring. Heavy solid line attachments to the cyclopentane ring indicates substituents in beta configuration, i.e., above the plane of the cyclopentane ring. The side-chain hydroxy at C-15 in formulas II to VII is in S configuration. See Nature, 212, 38 (1966) for discussion of the stereochemistry of the prostaglandins.

Molecules of the known prostaglandins each have several centers of asymmetry, and can exist in racemic (optically inactive) form and in either of the two enantiomeric (opticallly active) forms, i.e., the dextrorotatory and levorotatory forms. As drawn, formulas II to VII each represent the particular optically active form of the prostaglandin which is obtained from certain mammalian tissues, for example, sheep vesicular glands, swine lung, or human seminal plasma, or by carbonyl and/or double bond reduction of that prostaglandin. See, for example, Bergstrom et al., cited above. The mirror image of each of formulas II to VII represents the other enantiomer of that prostaglandin. The racemic form of a prostaglandin contains equal numbers of both enantiomeric molecules, and one of formulas II to VII and the mirror image of that formula is needed to represent correctly the corresponding racemic prostaglandin. For convenience hereinafter, use of the terms $PGE_1$, $PGE_2$, $PGE_3$, dihydro-$PGE_1$, $PGF_{1\alpha}$, $PGF_{2\alpha}$, $PGF_{3\alpha}$, and dihydro-$PGF_{1\alpha}$, will mean the optically active form of that prostaglandin with the same absolute configuration as $PGE_1$ obtained from mammalian tissues. When reference to the racemic form of one of those prostaglandins is intended, the word "racemic" will preceed the prostaglandin name, thus, racemic $PGE_2$ or racemic $PGF_{2\alpha}$.

$PGE_1$, $PGE_2$, $PGE_3$, dihydro-$PGE_1$, and the corresponding $PGF_\alpha$ compounds, and their esters and pharmacologically acceptable salts are extremely potent in causing various biological responses. For that reason, these compounds are useful for pharmacological purposes. See, for example, Bergstrom et al., Pharmacol. Rev. 20, 1 (1968), and references cited therein. A few of those biological responses are systemic arterial blood pressure lowering in the case of the PGE compounds as measured, for example, in anesthetized (pentobarbital sodium) pentolinium-treated rats with indwelling aortic and right heart cannulas; pressor activity, similarly measured, for the $PGF_\alpha$ compounds;

stimulation of smooth muscle as shown, for example, by tests on strips of guinea pig ileum, rabbit duodenum, or gerbil colon; potentiation of other smooth muscle stimulants; antipolytic activity as shown by antagonism of epinephrine-induced mobilization of free fatty acids or inhibition of the spontaneous release of glycerol from isolated rat fat pads; inhibition of gastric secretion in the case of the PGE compounds as shown in dogs with secretion stimulated by foods or histamine infusion; activity on the central nervous system; decrease of blood platelet adhesiveness as shown by platelet-to-glass adhesiveness, and inhibition of blood platelet aggregation and thrombus formation induced by various physical stimuli, e.g., arterial injury, and various biochemical stimuli, e.g., ADP, ATP, serotonin, thrombin, and collagen; and in the case of the PGE compounds, stimulation of epidermal proliferation and keratinization as shown when applied in culture to embryonic chick and rat skin segments.

Because of these biological responses, these known prostaglandins are useful to study, prevent, control, or alleviate a wide variety of diseases and undesirable physiological conditions in birds and mammals, including humans, useful domestic animals, pets, and zoological specimens, and in laboratory animals, for example, mice, rats, rabbits, and monkeys.

For example, these compounds, and especially the PGE compounds, are useful in mammals, including man, as nasal decongestants. For this purpose, the compounds are used in a dose range of about 10 $\mu$g. to about 10 mg. per ml. of a pharmacologically suitable liquid vehicle or as an aerosol spray, both for topical application.

The PGE compounds are useful in mammals, including man and certain useful animals, e.g., dogs and pigs, to reduce and control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 0.1 $\mu$g. to about 500 $\mu$g. per kg. of body weight per minute, or in a total daily dose by injection or infusion in the range about 0.1 to about 20 mg. per kg. of body weight per day, the exact dose depending on the age, weight, and condition of the patient or animal, and on the frequency and route of administration.

The PGE and PGF$_\alpha$ compounds are useful whenever it is desired to inhibit platelet aggregation, to reduce the adhesive character of platelets, and to remove or prevent the formation of thrombi in mammals, including man, rabbits, and rats. For example, these compounds are useful in the treatment and prevention of myocardial infarcts, to treat and prevent postoperative thrombosis, to promote patency of vascular grafts following surgery, and to treat conditions such as atherosclerosis, arteriosclerosis, blood clotting defects due to lipemia, and other cylinical conditions in which the underlying etiology is associated with lipid imbalance or hyperlipidemia. For these purposes, these compounds are administered systemically, e.g., intravenously, subcutaneously, intramuscularly, and in the form of sterile implants for prolonged action. For rapid response, especially in emergency situations, the intravenous route of administration is preferred. Doses in the range about 0.005 to about 20 mg. per kg. of body weight per day are used, to exact dose depending on the age, weight, and condition of the patient or animal, and on the frequency and route of administration.

The PGE and PGF$_\alpha$ compounds are especially useful as additives to blood, blood products, blood substitutes, and other fluids which are used in artificial extracorporeal circulation and perfusion of isolated body portions, e.g., limbs and organs, whether attached to the original body, detached and being preserved or prepared for transplant, or attached to a new body. During these circulations and perfusions, aggregated platelets tend to block the blood vessels and portions of the circulation apparatus. This blocking is avoided by the presence of these compounds. For this purpose, the compound is added gradually or in single or multiple portions to the circulating blood, to the blood of the donor animal, to the perfused body portion, attached or detached, to the recipient, or to two or all of those at a total steady state dose of about 0.001 to 10 mg. per liter of circulating fluid. It is especially useful to use these compounds in laboratory animals, e.g., cats, dogs, rabbits, monkeys, and rats, for these purposes in order to develop new methods and techniques for organ and limb transplants.

PGE compounds are extremely potent in causing stimulation of smooth muscle, and are also highly active in potentiating other known smooth muscle stimulators, for example, oxytocic agents, e.g., oxytocin, and the various ergot alkaloids including derivatives and analogs thereof. Therefore PGE$_1$, for example, is useful in place of or in combination with less than usual amounts of these known smooth muscle stimulators, for example, to relieve the symptoms of paralytic ileus, or to control or prevent atonic uterine bleeding after abortion or delivery, to aid in expulsion of the placenta, and during the puerperium. For the latter purpose, the PGE compound is administered by intravenous infusion immediately after abortion or delivery at a dose in the range about 0.01 to about 50 $\mu$g. per kg. of body weight per minute until the desired effect is obtained. Subsequent doses are given by intravenous, subcutaneous, or intramuscular injection or infusion during puerperium in the range 0.01 to 2 mg. per kg. of body weight per day, the exact dose depending on the age, weight, and condition of the patient or animal.

The PGE compounds are useful as hypotensive agents to reduce blood pressure in mammals, including man. For this purpose, the compounds are administered by intravenous infusion at the rate about 0.01 to about 50 $\mu$g. per kg. of body weight per minute, or in single or multiple doses of about 25 to 500 $\mu$g. per kg. of body weight total per day.

The PGE and PGF$_\alpha$ compounds are useful in place of oxytocin to induce labor in pregnant female animals, including man, cows, sheep, and pigs, at or near term, or in pregnant animals with intrauterine death of the fetus from about 20 weeks to term. For this purpose, the compound is infused intravenously at a dose 0.01 to 50 $\mu$g. per kg. of body weight per minute until or near the termination of the second stage of labor, i.e., expulsion of the fetus. These compounds are especially useful when the female is one or more weeks postmature and natural labor has not started, or 12 to 60 hours after the membranes have ruptured and natural labor has not yet started.

The PGF$_\alpha$ and PGE compounds are useful for controlling the reproductive cycle in ovulating female mammals, including humans and animals such as monkeys, rats, rabbits, dogs, cattle, and the like. For that purpose, PGE₂ or PGF₂ₐ, for example, is administered systemically, e.g., intravenously, subcutaneously, and intravaginally, at a dose level in the range 0.001 mg. to about 20 mg. per kg. of body weight of the female mammal, advantageously during a span of time starting approximately at the time of ovulation and ending approximately at the next expected time of menses or just prior to that time. Additionally, expulsion of an embryo or fetus is accomplished by similar administration of the compound during the first third of the normal mammalian gestation period.

As mentioned above, the PGE compounds are potent antagonists of epinephrine-induced mobilization of free fatty acids. For this reason, these compounds are useful in experimental medicine for both in vitro and in vivo studies in mammals, including man, rabbits, and rats, intended to lead to the understanding, prevention, symptom alleviation, and cure of diseases involving abnormal lipid mobilization and high free fatty acid levels, e.g., diabetes mellitus, vascular diseases, and hyperthyroidism.

SUMMARY OF THE INVENTION

It is a purpose of this invention to provide a process for preparing prostaglandin E acids and esters from the corresponding prostaglandin $F_\alpha$ compounds. It is a further purpose to provide a novel process for preparing 11.15-disilyl ether intermediates of prostaglandin $F_\alpha$ and E compounds useful in said process.

The presently described processes and intermediates are useful for preparing prostaglandin E acids and esters of the generic formula

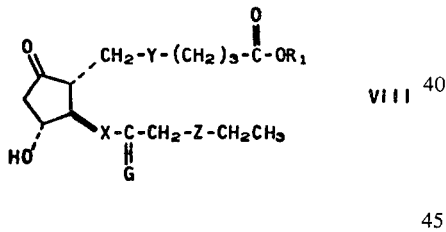
VIII or a racemic compound of that formula and the mirror image thereof, wherein (a) X is trans–CH=CH— or —CH₂CH₂—, and Y and Z are both —CH₂CH₂—, or (b) X is trans—CH=CH—, Y is cis—CH=CH—, and Z is —CH₂CH₂— or cis—CH=CH; wherein G is

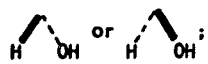

and wherein R₁ is hydrogen or alkyl of one to 8 carbon atoms, inclusive.

Accordingly there is provided a process for producing an optically active compound of the formula:

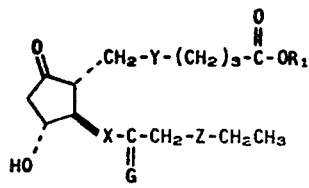
VIII or a racemic compound of that formula and the mirror image thereof, whererin (a) X is trans—CH=CH— or —CH₂CH₂—, and Y and Z are both —CH₂CH₂—, or (b) X is trans—CH=CH—, Y is cis —CH=CH—, and Z is —CH₂CH₂— or cis—CH=CH—; wherein G is

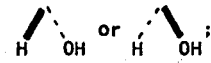

and wherein R₁ is hydrogen or alkyl of one to 8 carbon atoms inclusive, which comprises the steps, 1. preparing an optically active compound of the formula:

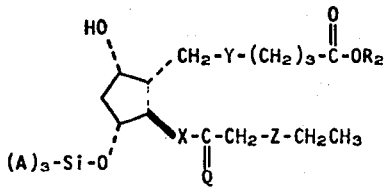

or a racemic compound of that formula and the mirror image thereof, wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive; wherein Q is

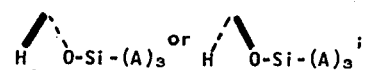

wherein R₂ is hydrogen, alkyl of one to 8 carbon atoms, inclusive, or —Si—(A)₃ wherein A is as defined above; and wherein X, Y, and Z are as defined above, by reacting an optically active compound of the formula

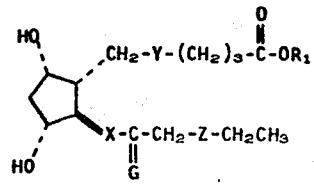
IX or a racemic compound of that formula and the mirror image thereof, wherein G, R₁, X, Y, and Z are defined above, with a silylating agent, 2. forming an optically active compound of the formula

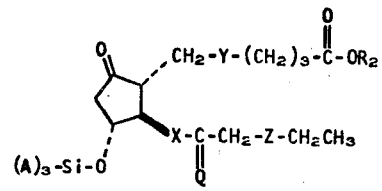
XI or a racemic compound of that formula and the mirror image thereof, wherein A, Q, R₂, X, Y, and Z are as defined above, by oxidizing the reaction product of step (1) with a reagent which selectively oxidizes secondary hydroxyl to carbonyl in the presence of carbon-carbon double bonds, and 3. hydrolyzing the reaction product of step (2).

Included in the formula-VIII products are the following compounds: PGE$_1$, PGE$_2$, PGE$_3$, and dihydro-PGE$_1$, and their 15β-epimers, and the esters of those compounds within the scope of R$_1$, and the racemic compounds of those compounds and esters and their enantiomorphs.

Included in the formula-IX starting materials are the following compounds: PGF$_{1\alpha}$, PGF$_{2\alpha}$, PGF$_{3\alpha}$, and dihydro-PGF$_{1\alpha}$, and their 15β-epimers, and the esters of those compounds within the scope of R$_1$, and the racemic compounds of those compounds and esters and their enantiomorphs.

Included in the formula-X PGF-type disilyl ethers of this invention are compounds of the following formulas:

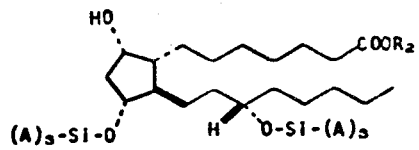

XII

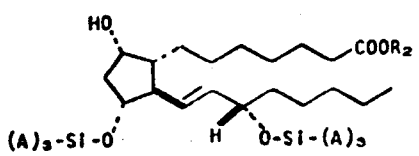

XIII

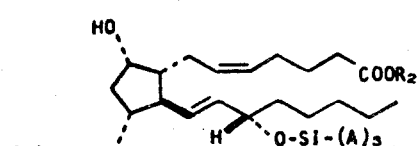

XIV

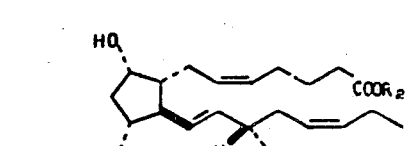

XV

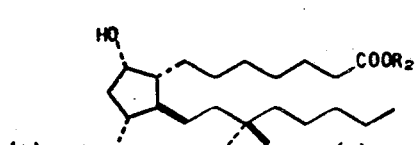

XVI

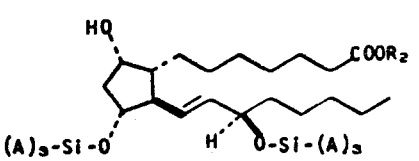

XVII

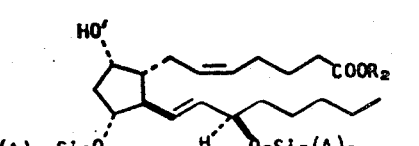

XVIII

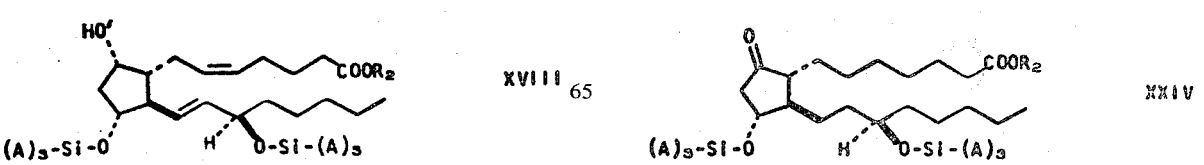

XIX

There are also included, within the invention, the racemic compounds of each respective formula and the mirror image thereof. As in the case of formulas II to VII, formulas XII to XV are each intended to represent optically active prostanoic acid derivatives with the same absolute configuration as PGE$_1$ obtained from mammalian tissues. Formulas XVI to XIX represent the corresponding 15-epimers, i.e., those prostanoic acid derivatives having the β (or R) configuration at C-15. Hereinafter "15β" refers to the epimeric configuration. Thus, "15β-PGF$_{2\alpha}$, 11, 15-bis(trimethylsilyl) ether" identifies a formula-XVIII compound having the β (or R) configuration at C-15 rather than the natural α (or S) configuration of PGF$_{2\alpha}$. One of formulas XII to XIX plus the mirror image of that formula are necessary in combination to describe a racemic compound. For convenience hereinafter, when the word "racemic" (or "dl") preceeds the name of one of the novel prostanoic acid derivatives of this inveniton, the intent is to designate a racemic compound represented by the combination of the appropriate formula XII to XIX and the mirror image of that formula. When the word "racemic" (or "dl") does not preceed the compound name, the intent is to designate an optically active compound represented only by the appropriate formula XII to XIX.

Included in the formula-XI PGE-type disilyl ethers of this invention are compounds of the following formulas:

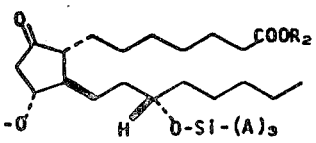

XX

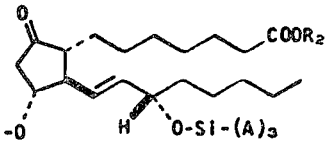

XXI

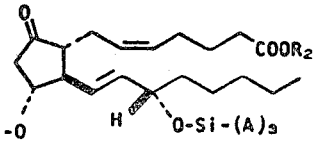

XXII

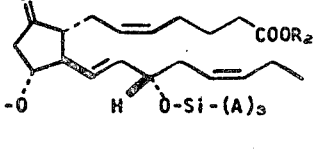

XXIII

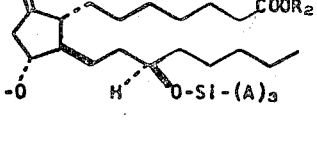

XXIV

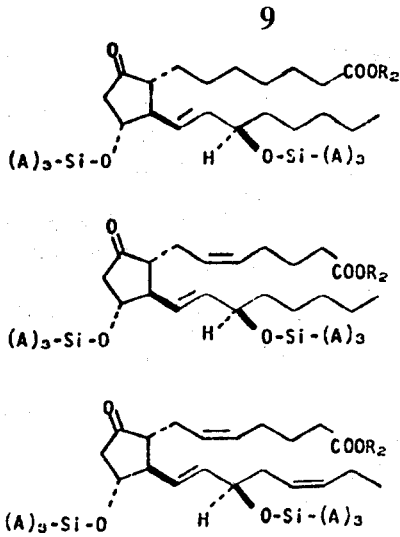

XXV

XXVI

XXVII

There are also included the racemic compounds of the formula-XI PGE-type compounds.

In formulas I-XXBII above, as well as in the formulas hereinafter, broken line attachments to a ring or chain represent substituents in alpha configuration, i.e., below the plane of the paper.

The formula X-to-XXVII compounds and their racemic compounds of this invention are useful in preparing the above-identified formula-VIII compounds by the process disclosed herein. The formula-VIII PGE-type end-products and their racemic compounds each cause the same biological responses described above for the corresponding known prostaglandins. Each of these PGE-type compounds, and their racemic compounds, is accordingly useful for the above-described pharmacological purposes and is used for those purposes as described above.

Reference to Chart A, herein, will make clear the transformation from the PGE-type compounds IX to the PGE-type compounds VIII by steps 1-3, inclusive. Formulas VIII, IX, X, and XI, hereinafter referred to, are depicted in Chart A, wherein (a) X is trans—CH=CH— or —CH$_2$CH$_2$—, and Y and Z are both —CH$_2$CH$_2$—, or (b) X is trans—CH=Ch— Y is cis—CH=CH—, and Z is —CH$_2$CH$_2$— or cis—CH=Ch—; wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive; wherein G is

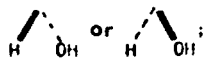

wherein Q is

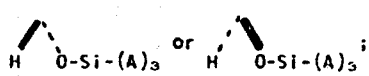

wherein $R_1$ is hydrogen or alkyl of one to 8 carbon atoms, inclusive: and wherein $R_2$ is hydrogen, alkyl of one to 8 carbon atoms, inclusive, or —Si—(A)$_3$ wherein A is as defined above. The various A's of a —SI—(A)$_3$ moiety are alike or different. For example, an —Si—(A)$_3$ can be trimethylsilyl, dimethylphentisilyl, or methylphenylbenzylsilyl. Example of alkyl of one to 4 carbon atoms, inclusive, are methyl, ethyl, propyl, isopropyl, butyl, isobutyl, sec-butyl, and tert-butyl. Examples of aralkyl of 7 to 12 carbon atoms, inclusive, are benzyl, phenethyl, a-phenylethyl, 3-phenylpropyl, α-naphthylmethyl, and 2-(β-naphthyl)ethyl. Examples of phenyl substituted with one or 2 fluoro, chloro, or alkyl of one to 4 carbon atoms, inclusive, are p-chlorophenyl, α-fluorophenyl, o-tolyl, 2,4-dichlorophenyl, p-tert-butylphenyl, 4-chloro-2-methylphenyl, and 2,4-dichloro-3-methylphenyl. Examples of alkyl of one to 8 carbon atoms, inclusive, for $R_1$ are methyl, ethyl, propyl, butyl, pentyl, hexyl, heptyl, octyl, and isomeric forms thereof.

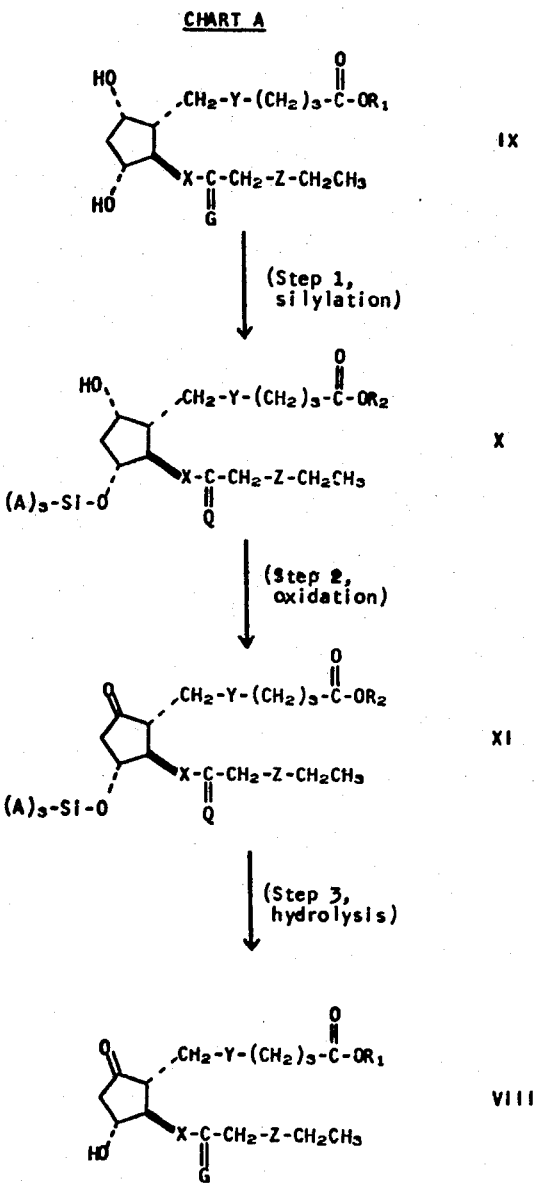

CHART A

Consider, first, step 1 of Chart A, wherein the formula-IX compounds are selectively silylated at the C-11 and C-15 positions. The PGFα starting materials have three hydroxyl groups in each molecule: C-9, C-11, and C-15. Suprisingly, I have found it possible to silylate substantially only the C-11 and C-15 hydroxyls, by choice of reagents and conditions. Silylating agents are known in the art. See, for example, Pierce, "Silylation of Organic Compounds," Pierce Chemical Co., Rockford, Ill. (1968).

I have found that silylating agents of the type $(A)_3$-$SiN(E)_2$, i.e., substituted silylamines wherein A is as defined above and E has the same definition as A, being the same or different, are useful for the above purpose at temperatures below about $-25°$ C. A preferred temperature range is about $-35°$ to $-50°$. At higher temperatures some silylation of C-9 hydroxyl groups as well as the C-11 and C-15 hydroxyl groups occurs, whereas at lower temperatures the rate of silylation is undesirable slow. Examples of the silylamine type silylating agents suitable for forming the formula-X intermediates having $(A)_3$—Si— groups within the scope of this invention include pentamethylsilylamine, pentaethylsilylamine, N-trimethylsilyldiethylamine, 1,1,1-triethyl-N,N-dimethylsilylamine, N,N-diisopropyl-1,1,1-trimethylsilylamine, 1,1,1-tributyl-N,N-dimethylsilylamine, N,N-dibutyl-1,1,1-trimethylsilylamine, 1-isobutyl-N,N,1,1-tetramethylsilylamine, N-benzyl-N-ethyl-1,1,1-trimethylsilylamine, N,N,1,1-tetramethyl-1-phenylsilylamine, N,N-diethyl-1,1-dimethyl-1-phenylsilylamine, N,N-diethyl-1-methyl-1,1-diphenylsilylamine, N,N-dibutyl-1,1,1-triphenylsilylamine, and 1-methyl-N,N,1,1-tetraphenylsilylamine.

The reaction is carried out with exclusion of atmospheric moisture, for example under a nitrogen atmosphere. It is conveniently done in a solvent such as acetone or dichloromethane, although the silylating agent itself, when used in excess, may also serve as a liquid medium for the reaction. The reaction ordinarily is completed in a few hours, and should be terminated when the C-11 and C-15 hydroxyl groups are silylated, to avoid side reactions. The progress of the reaction is conveniently monitored by thin-layer chromatography (TLC), utilizing methods known in the art.

I have further discovered that trisubstituted monochlorosilanes such as chlorotriphenylsilane will yield formula-X 11,15-disilyl ether intermediates within the scope of this invention under suitable conditions of temperature and time of reaction. For the above puprose, these reagents are used in the presence of a tertiary base such as pyridine at temperatures of or below $25°$ C., preferably in the range of about $0°$ to $+25°$ C. Examples of the trisubstituted monochlorosilanes suitable for this purpose include chlorotriethylsilane, chlorotriisobutylsilane, chlorotriphenylsilane, chlorotris(p-chlorophenyl)silane, chlorotri-m-tolysilane, and tribenzylchlorosilane. As in using the silylamines above, the progress of the reaction is monitored by TLC and the conditions for optimized 11,15-disilylation are determined by experimentation.

For either of the above types of silylating agents, an excess of the reagent over that stoichiometrically required is used, preferably at least a four-fold excess. When $r_1$ in the formula-IX starting material is hydrogen the —COOH moiety thereby defined may be partially or even completely transformed to —COO—Si—$(A)_3$, additional silylating agent being used for this purpose. Whether or not this occurs is immaterial for the success of my process, since —COOH groups are not changed by the subsequent steps and —COO—Si—$(A_3$ groups are easily hydrolyzed to —COOH groups.

Consider, Next, step 2 of Chart A, wherein the formula-X 11,15-disilyl ether intermediate is oxidized to compound XI. Oxidation reagents useful for this transformation are known to the art. An especially useful reagent for this purpose is the Collins reagent, i.e., chromium trioxide, n pyridine. See J. C. Collins et al., Tetrahedron Lett., 3363 (1968). Dichloromethane is a suitable diluent for this purpose. A slight excess of the oxidant beyond the amount necessary to oxidize the C-9 secondary hydroxy group of the formula-X intermediate is used. Reaction temperatures of below $20°$ C. should be used. Preferred reaction temperatures are in the range $-10°$ to $+10°$ C. The oxidation proceeds rapidly and is usually complete in about 5 to 20 minutes. The formula-VIII PGE-type product is isolated by conventional methods.

Examples of other oxidation reagents useful for this transformation are silver carbonate on Celite (Chem. Commun. 1102 (1969)), mixtures of chromium trioxide and pyridine J. Am. Chem. Soc. 75, 422 (1953), and Tetrahedron, 18, 1351 (1962)), t-butylchromate in pyridine (Biochem. J., 84, 195 (1962)), mixtures of sulfur trioxide in pyridine and dimethylsulfoxide (J. Am. Che. Soc. 89,5505 (1967)), and mixtures of dicyclohexylcarbodiimide and dimethyl sulfoxide (J. Am. Chem. Soc. 87, 5661 (1965)).

Finally in step 3 of Chart A, all silyl groups of the formula-XI intermediates are removed by hydrolysis, thereby forming the formula-VIII PGE-type products. These hydrolyses are carried out by prior art procedures known to be useful for transforming silyl ethers and silyl esters to alcohols and carboxylic acids, respectively. See, for example, Pierce, cited above, especially p. 447 thereof. A mixture of water and sufficient of a water-miscible organic diluent to give a homogeneous hydrolysis reaction mixture represents a suitable reaction medium. Addition of a catalytic amount of an organic or inorganic acid hastens the hydrolysis. The length of time required for the hydrolysis is determined in part by the hydrolysis temperature. With a mixture of water and methanol at $25°$ C., several hours is usually sufficient for hydrolysis. At $0°$ C., several days is usually necessary.

The initial optically active reactants of formula IX in Chart A, i.e., $PGF_{1\alpha}$, $PGF_{2\alpha}$, $PGF_{3\alpha}$, and dihydro-$PGF_{1\alpha}$, and their 15β-epimers and their alkyl esters are known in the art or are prepared by methods known in the art. See, for example, Bergstrom et al., cited above, U.S. Pat. No. 3,069,322, and British Specification No. 1,040,544. The initial racemic reactants of formula IX in Chart A, i.e., racemic $PGF_{1\alpha}$, racemic $PGF_{2\alpha}$, and racemic $PGF_{3\alpha}$ and their alkyl esters are known in the art or are prepared by methods known in the art. See, for example, Just et al., *Journal of the American Chemical Society* 91, 5364 (1969), Corey et al., *Journal of the American Chemical Society* 90, 3245 (1968), Schneider et al., *Chemical Communications* (Great Britain), 304 (1969), and Axen, *Chemical Communications*, 602 (1970).

Racemic dihydro-$PGF_{1\alpha}$ and its esters are prepared by catalytic hydrogenation of the corresponding racemic $PGF_{1\alpha}$ or $PGF_{2\alpha}$ compounds, for example, in the presence of 5% palladium-on-charcoal catalyst in ethyl acetate solution at 25° C. and one atmosphere pressure of hydrogen.

The 15β-PGF compounds are available from the corresponding PGF compounds by metods known in the art. See, for example, Pike et al., J. Org. Chem. 34, 3552 (1969).

As discussed above, the processes of Chart A lead either to acids ($R_1$ is hydrogen) or to alkyl esters ($R_1$ is alkyl of one to 8 carbon atoms, inclusive). When a formula-VIII PGE-type acid has been prepared and an alkyl ester is desired, esterification is advantageously accomplished by interaction of the acid with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley and Sons, Inc., New York, N.Y., Vol. 8, pp. 389–394 (1954).

An alternative method for esterification of the carboxyl moiety of the PGF-type compounds comprises transformation of the free acid to the corresponding silver salt, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

DESCRIPTION OF THE PREFERRED EMBODIMENTS

The invention can be more fully understood by the following examples.

All temperatures are in degrees centigrade.

NMR spectra are recorded on a Varian A-60 spectrophotometer with tetramethylsilane as an internal standard (downfield) and using solvents as indicated below.

Mass spectra are recorded on an Atlas CH-4 mass spectrometer with a TO-4 source (ionization voltage 70 ev).

"Brine", herein, refers to an aqueous saturated sodium chloride solution.

EXAMPLE 1

$PGF_{2\alpha}$, 11,15-Bis(trimethylsilyl) Ether, Methyl Ester (Formula X: A is methyl, Q is

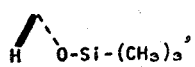

$R_2$ is methyl, X is trans—CH=CH—, Y is cis—CH=CH—, and Z is —$CH_2CH_2$—).

Refer to Chart A, step 1. N-Trimethylsilyldiethylamine ("TMSDEA") (0.6 ml.) is added slowly to a mixture of $PGF_{2\alpha}$ methyl ester (0.05 g.) and 2 ml. of acetone previously cooled to −40° C., and kept under nitrogen. Progress of the reaction is monitored by thin-layer chromatography (TLC). The reaction temperature is maintained at about −45° to −35° C. for 1.5 hr. whereupon the mixture is diluted with about 10 ml. of diethyl ether (previously cooled to −78° C.). The solution is washed with 20 ml. of cold saturated sodium bicarbonate solution, and the aqueous phase is washed with ether. The ether extract and washings are washed with brine, dried over sodium sulfate, and concentrated to yield the title compound, an oil; NMR peaks at 0.1, 0.8–2.7 (multiplet), 3.7, 3.8–4.2 (multiplet), and 5.2–5.6 (multiplet); mass spectral peaks at 487, 484, 441, 422, and 351.

Following the procedure of Example 1, but replacing $PGF_{2\alpha}$ methyl ester with $PGF_{2\alpha}$ and its ethyl, tert-butyl, and 2-ethylhexyl esters, there are obtained:

$PGF_{2\alpha}$, 11,15-bis(trimethylsilyl) ether;

$PGF_{2\alpha}$, 11,15-bis(trimethylsilyl) ether, ethyl ester, $PGF_{2\alpha}$, 11,15-bis(trimethylsilyl) ether, tert-butyl ester; and $PGF_{2\alpha}$, 11,15-bis(trimethylsilyl) ether, 2-ethylhexyl ester.

Following the procedure of Example 1, but replacing $PGF_{2\alpha}$ methyl ester with 15β-$PGF_{2\alpha}$ and its methyl, ethyl, tert-butyl, and 2-ethylehexyl esters, there are obtained:

15β-$PGF_{2\alpha}$, 11,15-bis(trimethylsilyl) ether;

15β-$PGF_{2\alpha}$, 11,15-bis(trimethylsilyl) ether, methyl ester;

15β-$PGF_{2\alpha}$, 11,15-bis(trimethylsilyl) ether, ethyl ester;

15β-$PGF_{2\alpha}$, 11,15-bis(trimethylsilyl) ether, tert-butyl ester;

15β-$PGF_{2\alpha}$, 11,15-bis(trimethylsilyl) ether, 2-ethylhexyl ester.

Following the procedure of Example 1, but replacing $PGF_{2\alpha}$ methyl ester with the free acids, methyl esters, ethyl esters, tert-butyl esters, and 2-ethylhexyl esters of $PGF_{1\alpha}$, $PGF_{2\alpha}$, dihydro-$PGF_{1\alpha}$, and their 15β-epimers, there are obtained the corresponding 11,15-bis(trimethylsilyl) ethers of those PGF-type compounds.

Following the procedure of Example 1, but replacing N-trimethylsilyldiethylamine with pentaethylsilylamine, 1,1,1-tributyl-N,N-dimethylsilylamine, and N,N,-1,1-tetramethyl-1-phenylsilylamine, there are obtained the corresponding 11,15-disilyl ethers of $PGF_{2\alpha}$, methyl ester, namely:

$PGF_{2\alpha}$, 11,15-bis(triethylsilyl) ether, methyl ester;

$PGF_{2\alpha}$, 11,15-bis(tributylsilyl) ether, methyl ester; and $PGF_{2\alpha}$, 11,15-bis(dimethylphenylsilyl) ether, methyl ester.

Also following the procedure of Example 1 but using in combination each of the above substituted silylamine silylating agents with each of the free acids, methyl esters, ethyl esters, tert-butyl esters, and 2-ethylhexyl esters of $PGF_{1\alpha}$, $PGF_{2\alpha}$, $PGF_{3\alpha}$, dihydro-$PGF_{1\alpha}$, 15β-$PGF_{1\alpha}$, 15β-$PGF_{2\alpha}$, 15β-$PGF_{3\alpha}$, and 15β-dihydro-$PGF_{1\alpha}$, there are obtained the corresponding 11,15-disilyl ethers of those compounds.

Also following the procedure of Example 1 but using the silylating agents of and following that example with the racemic forms of the PGF-type compounds of and following that example, there are obtained the corresponding 11,15-disilyl ethers of those racemic compounds, for example the 11,15-bis(trimethylsilyl) ethers of dl-PGF$_{1\alpha}$, di-PGE$_{2\alpha}$ methyl ester, dl-PGF$_{3\alpha}$ tert-butyl ester, and dl-dihydro-PGE$_{1\alpha}$ 2-ethylhexyl ester.

EXAMPLE 2

PGE$_2$, 11,15-Bis(trimethylsilyl) Ether, Methyl Ester (Formula XI: A is methyl, Q is

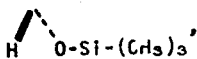

R$_2$ is methyl, X is trans—CH=CH—, Y is cis—CH=CH—, and Z is —CH$_2$CH$_2$—).

Refer to Chart A, step 2. A solution of PGF$_{2\alpha}$, 11,15-bis(trimethylsilyl) ether, methyl ester (Example 1, 0.080 g.) in 3 ml. of dichloromethane is added to Collins reagent, prepared from chromium trioxide (0.13 g.) and pyridine (0.20 g.) in 8 ml. of dichloromethane and cooled to 0° C. The mixture is stirred at 0° C. for 5 min., then at about 25° C. for 10 min., and filtered. The filtrate is concentrated to yield the title compound, a yellow oil.

Following the procedure of Example 2, but replacing PGF$_{2\alpha}$, 11,15-bis(trimethylsilyl) methyl ester, with the 11,15-bis(trimethylsilyl) ethers of PGF$_{2\alpha}$ and its ethyl, tert-butyl, and 2-ethylhexyl esters, there are obtained:

PGE$_2$, 11,15-bis(trimethylsilyl) ether,
PGE$_2$, 11,15-bis(trimethylsilyl) ether, ethyl ester;
PGE$_2$, 11,15-bis(trimethylsilyl) ether, tert-butyl ester; and
PGE$_2$, 11,15-bis(trimethylsilyl) ether, 2-ethylhexyl ester.

Following the procedure of Example 2, but using the 11,15-bis(trimethylsilyl) ethers of 15$\beta$-PGF$_{2\alpha}$ and its methyl, ethyl, tert-butyl, and 2-ethylhexyl esters, there are obtained:

15$\beta$-PGE$_2$, 11,15-bis(trimethylsilyl) ether;
15$\beta$-PGE$_2$, 11,15-bis(trimethylsilyl) ether, methyl ester;
15$\beta$-PGE$_2$, 11,15-bis(trimethylsilyl) ether, ethyl ester;
15$\beta$-PGE$_2$, 11,15-bis(trimethylsilyl) ether, tert-butyl ester; and
15$\beta$-PGE$_2$, 11,15-bis(trimethylsilyl) ether, 2-ethylhexylester.

Following the procedure of Example 2, but using the 11,15-bis(trimethylsilyl) ethers of the free acids methyl esters, ethyl esters, tert-butyl esters, and 2-ethylhexyl esters of PGF$_{1\alpha}$, PGE$_{3\alpha}$, dihydro-PGF$_{1\alpha}$, and their 15$\beta$-epimers, there are obtained the 11,15-bis(trimethylsilyl) ethers of the corresponding PGE-type compounds.

Following the procedure of Example 2, but using the other 11,15-disilyl ethers of PGF-type compounds and racemic-PGF-type compounds disclosed following Example 1, there are obtained the 11,15-disilyl ethers of the corresponding PGE-type compounds.

EXAMPLE 3

PGE$_2$, Methyl Ester (Formula VIII: G is

R$_1$ is methyl, X is trans—CH=CH—, Y is cis—CH=CH—, and Z is —CH$_2$CH$_2$—).

Refer to Chart A, step 3. A solution of PGE$_2$, 11,15-bis(trimethylsilyl) ether, methyl ester (Example 2, about 0.06 g.) in 6 ml. of methanol is mixed with 3 ml. of water and about 0.3 ml. of acetic acid at about 25° C. and stirred for about 15 min. The mixture is partitioned between diethyl ether and 0.2 M. sodium hydrogen sulfate. The ether extract is washed with saturated aqueous sodium bicarbonate, then with brine, dried over sodium sulfate, and concentrated to a product containing the title compound, a light yellow oil, 0.04 g. The product is subjected to chromatography on silica gel, eluting with 50 and 80% ethyl acetate-Skellysolve B (isomeric hexanes) and finally 100% ethyl acetate. Those fractions containing the title compound free of starting material and impurities are combined and concentrated to yield the title compound; TLC R$_f$ 0.4 on silica gel in ethyl acetate.

Following the procedure of Example 3 but replacing PGE$_2$, 11,15-bis(trimethylsilyl) ether, methyl ethers with the 11,15-bis(trimethylsilyl) esthers of PGE$_2$ and its ethyl, tert-butyl, and 2-ethylhexyl esters, there are obtained:

PGE$_2$;
PGE$_2$, ethyl ester;
PGE$_2$, tert-butyl ester; and
PGE$_2$, 2-ethylhexyl ester.

Following the procedure of Example 3 but using the 11,15-bis(trimethylsilyl) ethers of 15$\beta$-PGE$_2$ and its methyl, ethyl, tert-butyl, and 2-ethylhexyl esters, there are obtained:

15$\beta$-PGE$_2$;
15$\beta$-PGE$_2$, methyl ester;
15$\beta$-PGE$_2$, ethyl ester;
15$\beta$-PGE$_2$, tert-butyl ester; and
15$\beta$-PGE$_2$, 2-ethylhexyl ester.

Following the procedure of Example 3 but using the 11,15-bis(trimethylsilyl) ethers of the free acids, methyl esters, ethyl esters, tert-butyl esters, and 2-ethylhexyl esters of PGE$_1$, PGE$_3$, dihydro-PGE$_1$, and their 15$\beta$-epimers, there are obtained the corresponding PGE-type compounds.

Following the procedure of Example 3 but using the other 11,15-disilyl ethers of PGE-type compounds disclosed following Example 2, there are obtained the corresponding PGE-type compounds.

EXAMPLE 4

PGF$_{2\alpha}$, 11,15-Bis(trimethylsilyl) Ether, Trimethylsilyl Ester (Formula X: A is methyl, Q is Q is 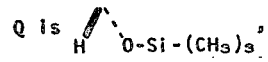

R$_2$ is Si—(CH$_3$)$_3$, X is trans—CH=CH—, Y is cis—CH=CH—, and Z is —CH$_2$CH$_2$—), and PGF$_2$, 11,15-Bis(trimethylsilyl) Ether (Formula X: R$_2$ is hydrogen, and A, Q, X, Y, and Z are as defined above).

N-Trimethylsilyldiethylamine (2 ml.) is added slowly to a mixture of PGF$_{2\alpha}$ (0.5 g.) and 20 ml. of acetone previously cooled to −30° C., while under nitrogen. The reaction temperature is maintained at about −30°

C. for 2 hrs. whereupon the mixture is concentrated under reduced pressure. The residue is subjected to chromatography, eluting with 0–50% acetone in dichloromethane. There are obtained, on concentration of the respective fractions, the two title compounds.

Following the procedures of Examples 2 and 3, but replacing PGF$_{2\alpha}$, 11,15-bis(trimethylsilyl) ether, methyl ester of Example 2 with the PGF$_{2\alpha}$, 11,15-bis(trimethylsilyl) ether, trimethylsilyl ester from above, there is obtained PGE$_2$. When that product is transformed to its methyl ester with diazomethane by procedures known in the art, there is obtained PGE$_2$, methyl ester having the same properties as the title compound of Example 3.

EXAMPLE 5

PGF$_{2\alpha}$, 11,15-Bis(triphenylsilyl) Ether, Methyl Ester (Formula X: A is phenyl, Q is

R$_2$ is methyl, X is trans—CH=CH—, Y is cis—CH=CH—, and Z is —CH$_2$CH$_2$—).

Refer to Chart A, step 1. A solution of PGF$_{2\alpha}$, methyl ester (0.05 g.), chlorotriphenylsilane (0.2 g.), and 5 ml. of anhydrous pyridine is stirred at about 25° C. under nitrogen. Progress of the reaction is monitored by TLC. After 2 hrs. about 5 ml. of water is added and the mixture is extracted with diethyl ether. The ether solution is washed with aqueous sodium hydrogen sulfate, saturated aqueous sodium bicarbonate, and brine, then dried over sodium sulfate and concentrated. The residue is subjected to silica gel chromatography. Those fractions shown by TLC to contain the desired compound free of starting material and impurities are combined and concentrated to yield the title compound.

Following the procedure of Example 5, but replacing chlorotriphenylsilane with chlorotriethylsilane, chlorotriisobutylsilane, chlorotriol -chlorophenyl)silane, chlorotri-m-tolylsilane, and tribenzylchlorosilane, there are obtained:

PGF$_{2\alpha}$, 11,15-bis(triethylsilyl) ether, methyl ester;

PGF$_{2\alpha}$, 11,15-bis(triisobutylsilyl) ether, methyl ester; PGF$_{2\alpha}$, 11,15-bis(tri-p-chlorophenyl)silyl ether, methyl ester;

PGF$_{2\alpha}$, 11,15-bis(tri-m-tolylsilyl) ether, methyl ester; and

PGF$_{2\alpha}$, 11,15-bis(tribenzylsilyl) ether, methyl ester.

Following the procedures of Examples 2 and 3, but replacing PGF$_{2\alpha}$, 11,15-bis(trimethylsilyl) ether, methyl ester, of Example 2 with the specific 11,15-disilyl ethers of and following Example 5, there is obtained in each instance PGE$_2$, methyl ester.

What is claimed is:

1. A process for producing an optically active compound of the formula:

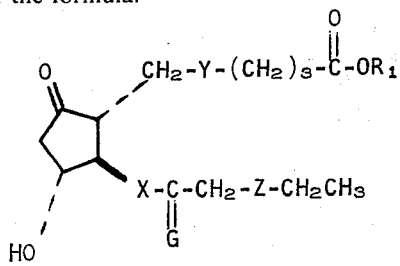

or a racemic compound of that formula and the mirror image thereof, wherein (a) X is trans—CH=OH— or —CH$_2$CH$_2$—, and Y and Z are both —CH$_2$CH$_2$—, or (b) X is trans—CH=CH—, Y is cis—CH=CH—, and Z is —CH$_2$CH$_2$— or cis—CH=CH—; wherein G is

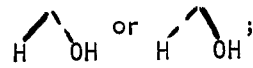

and wherein R$_1$ is hydrogen or alkyl of one to 8 carbon atoms inclusive, which comprises the steps:

1. preparing an optically active compound of the formula:

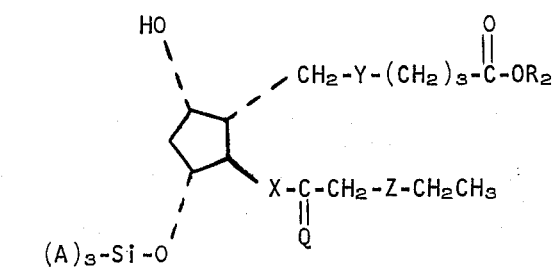

or a racemic compound of that formula and the mirror image thereof, wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive; wherein Q is

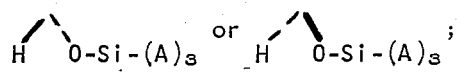

wherein R$_2$ is hydrogen, alkyl of one to 8 carbon atoms, inclusive, or —Si—(A)$_3$ wherein A is as defined above; and wherein X, Y, and Z are as defined above, by starting with an optically active compound of the formula

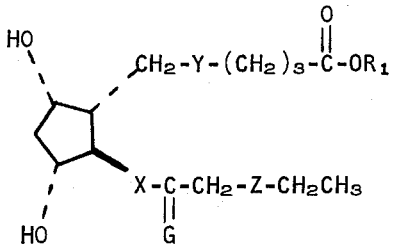

or a racemic compound of that formula and the mirror image thereof, wherein G, R$_1$, X, Y, and Z are defined above, and reacting it either (a) with a silylating agent of the formula (A)$_3$SiN(E)$_2$ wherein A is alkyl of one to 4 carbon atoms, inclusive, phenyl, phenyl substituted with one or 2 fluro, chloro, or alkyl of one to 4 carbon atoms, inclusive, or aralkyl of 7 to 12 carbon atoms, inclusive, and E has the same defineition as A, being the same or different, at a temperature in the range of about −25° to −50° C., or (b) with a silylating agent consisting of a trisubstituted monochlorosilane selected from the group consisting of chlorotriethylsilane, chlorotriisobutylsilane, chlorotriphenylsilane, chlorotris(p-chlorophenyl)silane, chlorotrim-tolylsilane, and tribenzylchlorosilane in the presence of a tertiary base at a temperature in the range of about 0° to +25° C.;

2. forming an optically active compound of the formula

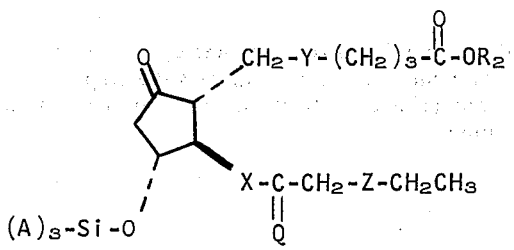

or a racemic compound of that formula and the mirror image thereof, wherein A, Q, R₂, X, Y, and Z are as defined above, by oxidizing the reaction product of step (1) with a reagent which selectively oxidizes secondary hydroxyl to carbonyl in the presence of carbon-carbon double bonds; and 3. hydrolyzing the reaction product of step (2).

2. A process according to claim 1 wherein the product is optically active, with the formula shown.

3. A process according to claim 2 wherein G is

4. A process according to claim 3 wherein X is trans—CH=CH—, Y is cis—CH=CH—, and Z is —CH₂CH₂—.

5. A process according to claim 4 wherein A is methyl.

6. A process according to claim 1 wherein the product is PGE₂, methyl ester.

7. A process for producing an optically active compound of the formula:

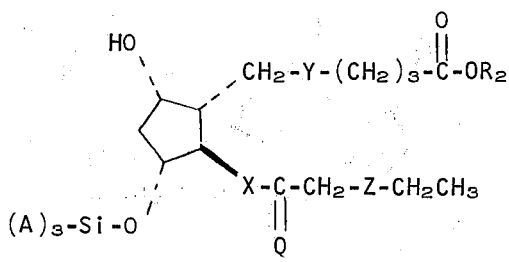

or a racemic compound of that formula and the mirror image thereof, wherein (a) X is trans—CH=CH— or —CH₂CH₂—, and Y and Z are both —CH₂CH₂—, or (b) X is trans—CH=CH—, Y is cis—CH=CH—, and Z is —CH₂CH₂— or cis—CH=CH—, wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atomes, inclusive, wherein Q is

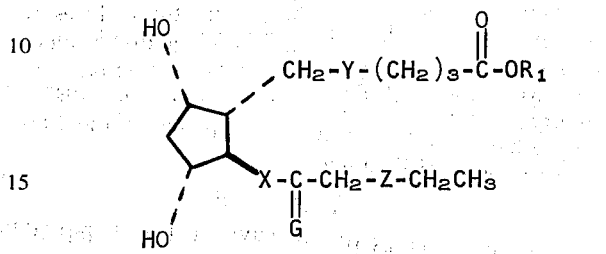

and wherein R₂ is hydrogen, alkyl of one to 8 carbon atoms, inclusive, or —Si—(A)₃ wherein A is as defined above, which comprises reacting an optically active compound of the formula:

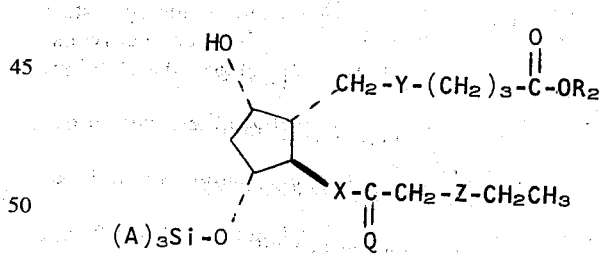

or a racemic compound of that formula and the mirror image thereof, wherein in G is

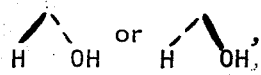

R₁ is hydrogen or alkyl of one to 8 carbon atoms, inclusive, and X, Y, and Z are as defined above, with a silylating agent of the formula (A)₃SiN(E)₂ wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive, and E has the same definition as A, being the same or different, at a temperature in the range of about −25° to −50° C.

8. A process according to claim 7 wherein the silylating agent is N-trimethylsilyldiethylamine and the reaction temperature is in the range of about −35° to −50° C.

9. A process for producing an optically active compound of the formula

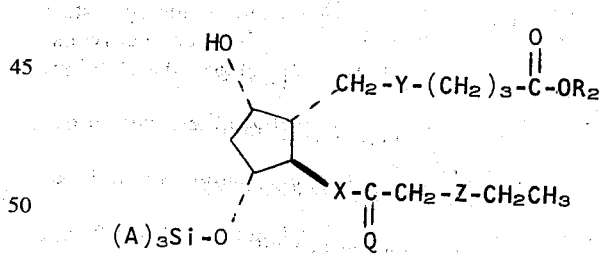

or a racemic compound of that formula and the mirror image thereof, wherein (a) X is trans—CH=CH— or —CH₂CH₂—, and Y and Z are both —CH₂CH₂—, or (b) X is trans—CH=CH—, Y is cis—CH=CH—, and Z is —CH₂CH₂— or cis—CH=CH—, wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive, wherein Q is

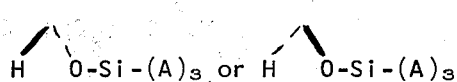

and wherein $R_2$ is hydrogen, alkyl of one to 8 carbon atoms, inclusive, or $-Si-(A)_3$ wherein A is as defined above, which comprises reacting an optically active compound of the formula:

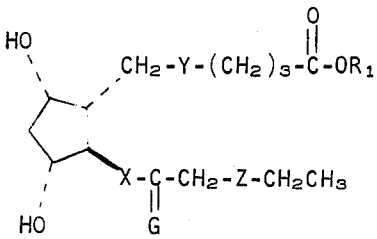

or a racemic compound of that formula and the mirror image thereof, wherein G is

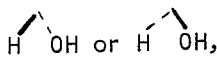

$R_1$ is hydrogen or alkyl of one to 8 carbon atoms, inclusive, and X, Y, and Z are as defined above, with a silylating agent consisting of a trisubstituted monochlorosilane selected from the group consisting of chlorotriethylsilane, chlorotriisobutylsilane, chlorotriphenylsilane, chlorotris(p-chlorophenyl)silane, chlorotri-m-tolylsilane, and tribenzylchlorosilane in the presence of a tertiary base at a temperature in the range of about 0° to +25° C.

10. A process for producing an optically active compound of the formula

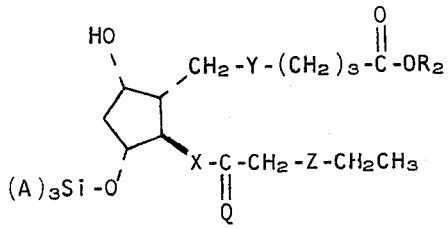

or a racemic compound of that formula and the mirror image thereof, wherein (a) X is trans—$CH=CH-$ or $-CH_2CH_2-$, and Y and Z are both $-CH_2CH_2-$, or (b) X is trans—$CH=CH-$, Y is cis—$CH=CH-$, and Z is $-CH_2CH_2-$ or cis—$CH=CH-$, wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive, wherein Q is

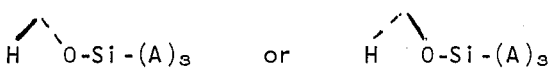

and wherein $R_2$ is hydrogen, alkyl of one to 8 carbon atoms, inclusive, or $-Si-(A)_3$ wherein A is as defined above, which comprises reacting an optically active compound of the formula:

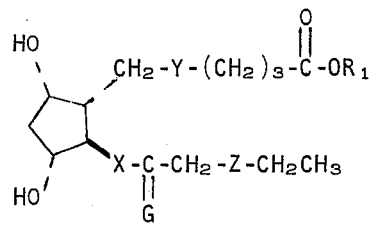

or a racemic compound of that formula and the mirror image thereof, wherein G is

$R_1$ is hydrogen or alkyl of one to 8 carbon atoms, inclusive, and X, Y, and Z are as defined above, with chlorotriphenylsilane in the presence of pyridine at a temperature of about 25° C.

* * * * *

UNITED STATES PATENT OFFICE
CERTIFICATE OF CORRECTION

Patent No. 3,892,792                              Dated July 1, 1975

Inventor(s) Ernest W. Yankee

It is certified that error appears in the above-identified patent and that said Letters Patent are hereby corrected as shown below:

Column 9, line 24, "I-XXBII" should read -- I-XXVII --; line 45, "-CH=Ch-" should read -- -CH=CH- --; line 47, "-CH=Ch-" should read -- -CH=CH- --. Column 10, line 4, "dimethylphentisilyl" should read -- dimethylphenylsilyl --; line 13, "$\alpha$-" should read -- m- --. Column 11, line 66, "$r_1$" should read -- $R_1$ --. Column 12, line 12, ",n" should read -- in --. Column 14, line 45, "$PGF_{2\alpha}$" should read -- $PGF_{3\alpha}$ --. Column 15, line 7, "di-$PGE_{2\alpha}$" should read -- dl-$PGF_{2\alpha}$ --; line 8, "-$PGE_{1\alpha}$" should read -- -$PGF_{1\alpha}$ --; line 30, "(trimethylsilyl) methyl ester," should read -- (trimethylsilyl) ether, methyl ester, --. Column 16, line 25, "ethers" should read -- ester --; line 26, "esthers" should read -- ethers --. Column 17, line 40, "chlorotriol -chlorophenyl)" should read -- chlorotris(p-chlorophenyl) --. Column 19, line 4, "chlorotrimtolylsilane" should read -- chlorotri-m-tolylsilane --.

$\mathfrak{Signed}$ and $\mathfrak{Sealed}$ this

Ninth $\mathfrak{Day}$ of November 1976

[SEAL]

Attest:

RUTH C. MASON
Attesting Officer

C. MARSHALL DANN
Commissioner of Patents and Trademarks